(12) United States Patent
Dawson et al.

(10) Patent No.: US 7,199,706 B2
(45) Date of Patent: Apr. 3, 2007

(54) PLC INTERCOM/MONITOR

(75) Inventors: Thomas Patrick Dawson, Escondido, CA (US); Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 271 days.

(21) Appl. No.: 11/062,647

(22) Filed: Feb. 22, 2005

(65) Prior Publication Data

US 2006/0187022 A1    Aug. 24, 2006

(51) Int. Cl.
*G08B 1/08* (2006.01)

(52) U.S. Cl. ............ 340/538; 340/538.11; 340/538.12; 340/538.17; 340/310.18; 375/257; 725/130

(58) Field of Classification Search .............. 340/538, 340/538.11, 538.12, 538.17, 310.12, 310.13, 340/310.18; 375/257, 258, 260; 725/130
See application file for complete search history.

(56) References Cited

U.S. PATENT DOCUMENTS

| | | |
|---|---|---|
| 3,942,168 A | 3/1976 | Whyte |
| 3,967,264 A | 6/1976 | Whyte et al. |
| 4,065,763 A | 12/1977 | Whyte et al. |
| 4,130,874 A | 12/1978 | Pai |
| 4,538,136 A | 8/1985 | Drabing |
| 4,554,411 A | 11/1985 | Armstrong |
| 4,772,870 A | 9/1988 | Reyes |
| 5,161,021 A | 11/1992 | Tsai |
| 5,351,272 A | 9/1994 | Abraham |
| 5,351,276 A | 9/1994 | Doll, Jr. et al. |

(Continued)

OTHER PUBLICATIONS

Bruce Schneier "Data Encryption Standard (DES)", Applied Cryptography, Second Edition: Protocols, Algorithms, and Source Code in C., Ch. 12, John Wiley & Sons, Inc., New York, 1996.

(Continued)

*Primary Examiner*—Davetta W. Goins
(74) *Attorney, Agent, or Firm*—Miller Patent Services; Jerry A. Miller

(57) ABSTRACT

A digital intercom device consistent with certain embodiments uses power line communication (PLC). A power line interface connects to a power line serving as a communication medium. An audio codec is coupled to the power line interface for encoding and decoding digital data to and from data suitable for use by the power line interface. A digital to analog converter receives digital decoded data from the codec and converts the digital coded data to a received analog signal. A receive audio amplifier amplifies the received analog signal to a level adequate to drive a speaker. A transmit audio amplifier amplifies a transmit audio signal and provides an amplified transmit audio signal as an output. An analog to digital converter converts the amplified transmit audio signal to a digital representation thereof and passes the digital representation to the codec. A control processor controls operation of the interface and the audio codec. A switch interface receiving a signal from a push-to-talk switch, which causes the codec to encode the digital representation and the power line interface to place an OFDM modulated version of the digital representation onto the power line. This abstract should not be considered limiting since other embodiments may incorporate more, fewer or different elements that those described in this abstract.

28 Claims, 2 Drawing Sheets

U.S. PATENT DOCUMENTS

| | | |
|---|---|---|
| 5,610,841 A | 3/1997 | Tanaka et al. |
| 5,630,204 A | 5/1997 | Hylton et al. |
| 5,754,773 A | 5/1998 | Ozden et al. |
| 5,754,784 A | 5/1998 | Garland et al. |
| 5,787,150 A | 7/1998 | Reiman et al. |
| 5,835,495 A | 11/1998 | Ferriere |
| 5,884,262 A | 3/1999 | Wise et al. |
| 5,926,789 A | 7/1999 | Barbara et al. |
| 6,097,288 A | 8/2000 | Koeppe, Jr. |
| 6,106,399 A | 8/2000 | Baker et al. |
| 6,118,790 A | 9/2000 | Bolosky et al. |
| 6,119,116 A | 9/2000 | Rose |
| 6,161,149 A | 12/2000 | Achacoso et al. |
| 6,182,045 B1 | 1/2001 | Kredo et al. |
| 6,222,838 B1 | 4/2001 | Sparks et al. |
| 6,240,448 B1 | 5/2001 | Imielinski et al. |
| 6,275,144 B1 | 8/2001 | Rumbaugh |
| 6,327,624 B1 | 12/2001 | Mathewson et al. |
| 6,356,971 B1 | 3/2002 | Katz et al. |
| 6,369,722 B1 | 4/2002 | Murgia et al. |
| 6,377,163 B1 | 4/2002 | Deller et al. |
| 6,396,393 B2 * | 5/2002 | Yuasa ......................... 375/260 |
| 6,417,762 B1 | 7/2002 | Comer |
| 6,441,723 B1 * | 8/2002 | Mansfield et al. ..... 340/538.11 |
| 6,578,051 B1 | 6/2003 | Mastronardi et al. |
| 6,618,396 B1 | 9/2003 | Kondo |
| 6,671,360 B2 | 12/2003 | Sumiya et al. |
| 7,049,939 B2 * | 5/2006 | Ikeda et al. ............ 340/310.18 |
| 7,098,773 B2 * | 8/2006 | Berkman .................... 370/485 |
| 2002/0056116 A1 | 5/2002 | Smith |
| 2003/0037142 A1 | 2/2003 | Munger et al. |
| 2003/0052770 A1 | 3/2003 | Mansfield, Jr. et al. |
| 2003/0088706 A1 | 5/2003 | Chan et al. |
| 2003/0236904 A1 | 12/2003 | Walpole et al. |
| 2004/0177167 A1 | 9/2004 | Iwamura et al. |

OTHER PUBLICATIONS

Intellon No New Wires, "Choosing the Right Home Networking Technology", pp. 1-5, Pub. Date not avail.

Intellon No New Wires, "PowerPacket Primer", pp. 1-5, Pub. Date not avail.

Intellon No New Wires, "PowerPacket Tutorial", pp. 1-10, Pub Date not avail.

Homeplug Powerline Alliance, "HomePlug 1.0 Technical White Paper", Sep. 2004.

Devolo AG, Microlink dLAN Audio, Devolo AG, Germany, 12 pages of product description, Sep. 2, 2004.

* cited by examiner

PLC INTERCOM/MONITOR

CROSS REFERENCE TO RELATED DOCUMENTS

This application is related to U.S. Provisional Patent Application No. 60/576,090, filed Jun. 8, 2004, which is hereby incorporated herein by reference. This application is also related to the following U.S. patent applications which are hereby incorporated by reference herein: Ser. No. 60/488,518, filed Jul. 17, 2003; Ser. No. 10/723,079, filed Nov. 25, 2003; Ser. No. 60/520,591, filed Nov. 17, 2003; Ser. No. 10/779,400, filed Feb. 16, 2004; and Ser. No. 10/379,626, filed Mar. 4, 2003.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

It is not easy to add an intercom to an existing home. Adding wiring within the walls to add an intercom system to an existing home can be very expensive. Analog power line intercom systems have been available for a number of years, for example from Radio Shack, but such devices tend to be quite noisy and therefore difficult to use—especially for the hard of hearing. Such intercom systems are believed to transfer an analog modulated voice signal over an electrical AC line which is received at another point or socket on the electrical line where it is demodulated back into its voice components and amplified. Such systems, as noted, generally fail to provide quality audio.

Power line Audio/Video networks will likely gain wide acceptance and be used extensively in homes in near future. Certain of these networks using the HomePlug® standard were designed to target video streaming. Audio streaming occupies less than 10% of the bandwidth that video streaming uses. Therefore, little consideration has been given to handling audio applications in such video oriented networks.

BRIEF DESCRIPTION OF THE DRAWINGS

Certain exemplary embodiments may be best understood by reference to the following detailed description taken in conjunction with the accompanying drawings in which.

DETAILED DESCRIPTION

Figure 1:
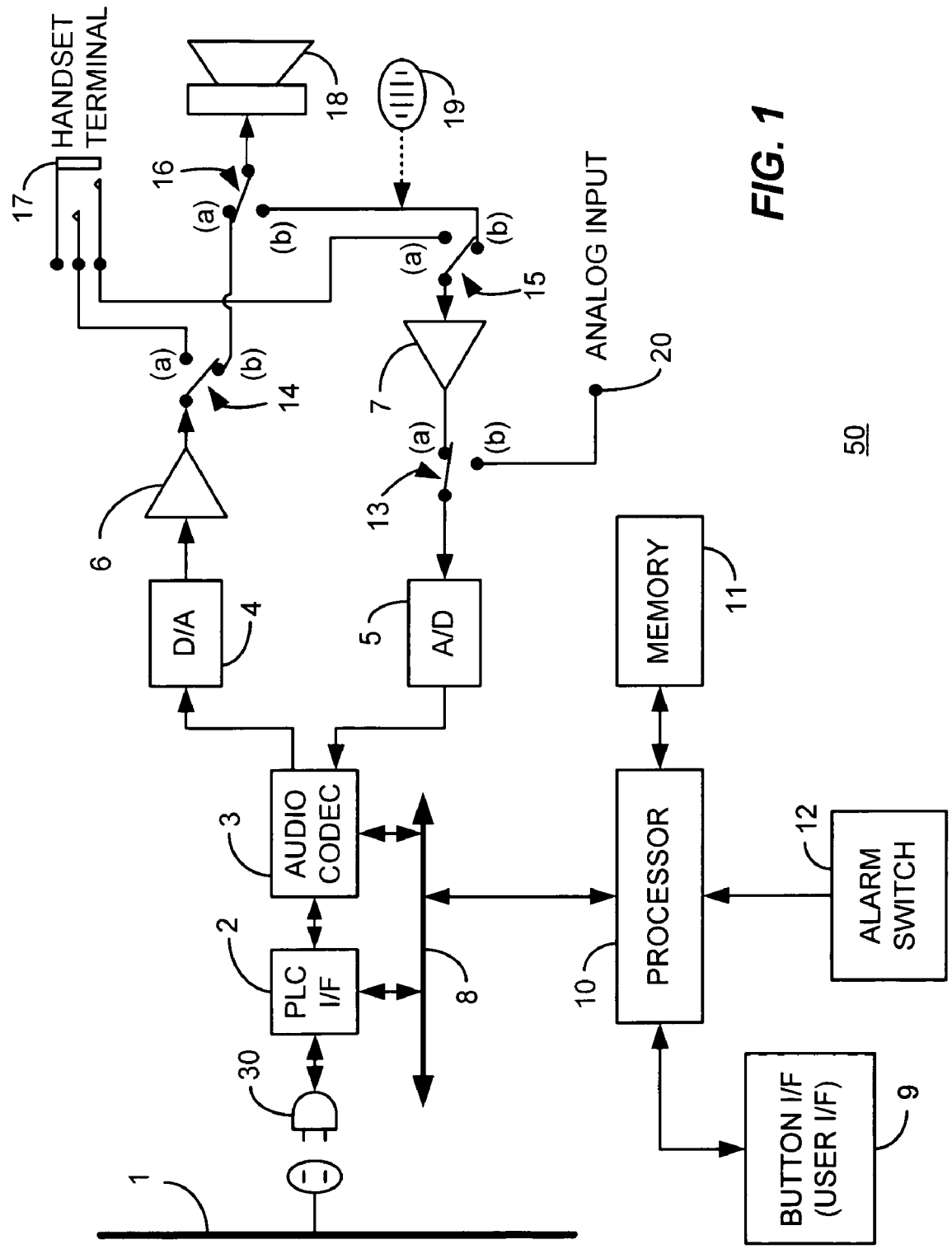
FIG. 1 is a block diagram of a power line network intercom consistent with certain embodiments of the present invention.

There is shown in the drawings and will herein be described in detail specific embodiments, with the understanding that the present disclosure is to be considered as exemplary and is not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

For purposes of this document, the term "power line communication network" and similar terms are intended to embrace any digital network that utilizes electrical power lines within a home, office or other structure as the communication medium used for network communication between connected devices. In particular, this term is used to encompass networks designed to use the HomePlug® network standards, current and future, which utilize spread spectrum techniques and Orthogonal Frequency Division Multiplexing (OFDM) to provide communications over the power line medium within the 4 to 30 MHz frequency band.

As noted above, it is not easy to add an intercom to an existing home. Adding wiring within the walls to add an intercom system to an existing home can be very expensive. What is needed is a means to add a high quality intercom system or monitor system to an existing home without added expense for wiring. Certain embodiments consistent with the present invention use digital power line communications (PLC) to provide an intercom system for the home without the need to add wiring to the home to support an intercom system.

Certain embodiments consistent with the present invention use power line communications to create an in-home intercom system. The system user interface has a speaker (that, in certain embodiments, also acts as a microphone) and a push-to-talk (PTT) button. In other embodiments, a microphone can also be provided. Pressing the PTT button switches the speaker from playing audio to acting as a microphone in certain embodiments, or alternatively a microphone is provided for receipt of audio and conversion to electric signals. Any plugged-in unit that does not have the push-to-talk button depressed will play the sound from any sending system. The system has an internal audio codec and a PLC network interface. Minimal buffering can be used to keep system latency low. If two systems have the PTT button depressed then the first system that depressed the button will be heard. Because the system is PLC based it uses the existing power lines in the home and no extra wiring is needed for the intercom system. By using the HomePlug® standard for PLC networks, reliable, low noise, high quality audio communication can be obtained.

FIG. 1 shows an example of a power line communication intercom device consistent with certain embodiments. Processor 10, which may for example be implemented as a programmed microprocessor or microcontroller, controls all blocks through the internal bus 8 or through other buses (not shown) in other embodiments. Processor 10 furthermore controls the position of each of the switches shown in the drawing. Memory 11 stores a software or firmware program for Processor 10. Memory 11 also has working memory space to run the program and/or to store configuration information and other data. Button or Switch Interface 9 in this embodiment includes the human interface controls such as volume up/down buttons, destination buttons, mode change buttons and PTT button. In normal intercom operation, the user holds the PTT button while he/she speaks, and operates the other buttons in an expected manner. That is, to increase volume, a volume up button can be pressed repeatedly until the desired volume is achieved. In other embodiments, a dial or rheostat can be used in place of volume buttons, and any other suitable user interface can be substituted without departing from embodiments consistent with the present invention.

In certain embodiments the system operates in any of several modes that are selected using the mode switch or other user interface control mechanism as described below:

(1) Audio Stream Mode (Transmission)

An audio stream is input from Analog Input 20 and Analog-to-Digital converted in A/D converter 5. Switch 13 is connected to (b). The output of A/D 5 is audio encoded in Audio Codec 3 and sent to PLC Interface 2. The data is processed to produce PLC compatible signals and sent to the destination over the power line 1. The audio source may be a digital input from a CD/DVD player (either integral or as a separate component) or a stream stored in a hard disk drive or flash memory. In this manner, the intercom system can double as a mechanism to distribute background music throughout the house.

(2) Audio Stream Mode (Reception)

The audio stream sent over the power line 1 is received in PLC I/F 2 (of a similar unit also connected to the power line) and decoded in Audio Codec 3. The output of Audio Codec 3 is Digital-to-Analog converted in D/A converter 4 and amplified in Amplifier 6. In this mode, the switch position of Switch 14 is (b). Switch 16 is (a). The amplified audio signal is sent to Speaker 18 for playout to the user.

(3) Intercom Mode

An intercom signal sent from the transmitter is processed similarly to the audio stream as described above. When the user speaks, the PTT button in Button I/F 9 is pressed to enable the audio transmission mode. Processor 10 turns Switch 16 to (b). Switch 15 is connected to (b). Speaker 18 works as a microphone, or alternately, microphone 19 is provided and switch 16 is omitted. The output signal from Speaker 18 or microphone 19 is amplified in Amplifier 7 and sent to A/D 5. The position of Switch 13 is (a). The output from A/D 5 is encoded in Audio Codec 3, processed in PLC Interface (I/F) 2 and sent to the destination over powerline 1.

Microphone 19 is optional. When Microphone 19 is used, Switch 14 (b) is directly connected Speaker 18 and Switch 16 is not necessary. Use of a separate Microphone is desirable in some embodiments to produce higher quality audio than might be achieved by using a Speaker 18, but possibly at the expense of higher part cost. The term microphone and microphone device as used herein, thus means any electromechanical or other device that is functioning in the capacity of a microphone, including actual microphones as well as speakers or other transducer devices that operate as microphones.

If Audio Codec 3 can simultaneously handle both encoding and decoding, intercom communication will be full duplex. The user can speak while listening in this embodiment. In this case, it is possible to eliminate the PTT button, however, this may present a privacy issue since speech may be inadvertently picked up and a mute button would preferably be provided to facilitate privacy. By use of both a PTT button and a full duplex Codec, the user will be able to hear while speaking, but only speech that occurs during actuation of the PTT button is available to receiving stations.

Many audio codec chips do not encode and decode at the same time. In that case, communication takes place in half duplex mode. The user holds down the PTT button when speaking, and while speaking, the user cannot hear information coming from other stations.

(4) VoIP Mode

The system can be expanded to be a VoIP phone by adding a hand set and a keypad. Such keypad can be implemented as a part of Interface 9. In VoIP mode an audio signal is processed in the same way as in the intercom mode. A difference is the destination is not in the powerline network, but somewhere on the Internet as determined by a destination identifier (e.g., a telephone number or IP address) entered using the key pad. In this mode, the powerline 1 is connected to the Internet, for example, with a cable or ADSL modem, and thus serves as a gateway to the Internet.

When a handset or headset is used, Switch 14 and 15 are connected to (a). A handset or headset is connected to Handset Terminal 17. The handset (not shown) has a speaker and a microphone (or combined speaker/microphone), which work in the same manner as Speaker 18 and Microphone 19.

(5) Security Applications

The present apparatus can, with minor modification, also operate in several other modes that can be used for security and/or safety applications. In one embodiment, the system can act as a burglar alarm. In this case, a signal from an Alarm Switch such as a Door Switch 12 or Window Switch, or other security related switch) goes to Processor 10. Alarm Switch 12 can be, for example, magnetic reed switch functioning as a Door Switch 12. When the door is closed, Door Switch 12 is also closed in this embodiment (or open in other embodiments).

Once the system is armed, Processor 10 starts monitoring the switch. When the door opens, the alarm switch 12 opens. Processor 10 detects the switch closure (or opening) and sends an alert signal to Speaker 18 and the other intercom units. Such alert signal can be stored in memory as a file that is converted at Codec 3 and transmitted via PLC interface 2 to Powerline 1. In addition, when the PLC network includes an Internet gateway of some type, the detection of an intruder could cause a telephone call to be placed to the police, etc. The system could similarly be wired to any suitable alarm switch such as a door switch, a window switch, a motion detection switch, a fire detection switch, and a carbon dioxide detection switch or other environment monitor/detector devices in order to detect a threshold alert condition from any such detector.

(6) Room/Baby Monitor

In this embodiment, a unit can be installed within a baby's room or other room that one desires to monitor. The unit operates in a manner similar to wireless baby monitors, except without the likelihood of interference and with higher fidelity than that often found with wireless monitors. In order to implement this mode of operation, the device can be configured as a transmit-only device by omission of the speaker 18 and audio amplifier 6, and possibly use of a less sophisticated codec 3. In another embodiment, the same hardware can simply be configured such that the PTT button of interface 9 operates in a push-on/push-off mode. In this manner, the button is pushed to actuate the talk button and the device acts as a monitor until the button is pressed again. Alternately, a toggle switch mechanism can be used such that the device operates in the same PTT mode, except that the toggle switch stays in the talk mode until toggled back to the "listen" position. In still other embodiments, a dedicated monitor mode is used in which the PTT function is locked on. Other embodiments will occur to those skilled in the art upon consideration of the present teachings.

Generally speaking, for most any of the above embodiments, when several units have the button depressed the codec could interleave and/or combine the audio from several source units so that all sending systems could be heard at one time. The sender could select a destination unit or send in broadcast mode. The music is automatically muted so the receiver never misses the call even when he/she is listening to heavy metal or other loud music. Also, in each case, in the preferred embodiment, the PLC interface utilizes a standard HomePlug® compliant interface to the power line in order to facilitate low cost, high quality communication.

When an intercom/monitor unit is plugged into an electrical outlet and powered up, the unit looks for a Dynamic Host Configuration Protocol (DCHP) server. If no DCHP server is found, the unit will back off for a small random amount of time and retry. If no DHCP server can be found, the unit assumes the role of DCHP server. Thus, the first unit plugged in becomes the DCHP server. If power to the home is interrupted, when power is restored, the retry mechanism allows one of the units to become the DCHP server.

In accordance with the preferred embodiment, each intercom/monitor unit is compliant with the HomePlug® standard. HomePlug® uses (Orthogonal Frequency Division Multiplexing) OFDM technology is based on point to point because available carriers depend upon a transmission path. However, Homeplug® can broadcast using Robust OFDM (Robo) mode. Robo utilizes a very robust modulation technique at the sacrifice of data rate (only 1 Mhz). While this is slow for a video application, it is quite adequate for streaming audio. Broadcast using HomePlug® is a one way transmission, so that even if a packet drop occurs it is not sent again.

Thus, a digital intercom device consistent with certain embodiments uses power line communication (PLC). A power line interface connects to a power line serving as a communication medium. An audio codec is coupled to the power line interface for encoding and decoding digital data to and from data suitable for use by the power line interface. A digital to analog converter receives digital decoded data from the codec and converts the digital coded data to a received analog signal. A receive audio amplifier amplifies the received analog signal to a level adequate to drive a speaker. A transmit audio amplifier amplifies a transmit audio signal and provides an amplified transmit audio signal as an output. An analog to digital converter converts the amplified transmit audio signal to a digital representation thereof and passes the digital representation to the codec. A control processor controls operation of the interface and the audio codec. A switch interface receiving a signal from a push-to-talk switch, which causes the codec to encode the digital representation and the power line interface to place an OFDM modulated version of the digital representation onto the power line.

A digital room monitor device using power line communication (PLC) consistent with certain embodiments has a power line interface for connection to a power line serving as a communication medium, wherein the interface communicates over the power line using Orthogonal Frequency Division Multiplexing (OFDM). An audio codec is coupled to the power line interface for encoding digital data to a format suitable for use by the power line interface. A microphone device is provided and a transmit audio amplifier amplifies a transmit audio signal and provides an amplified transmit audio signal as an output. An analog to digital converter converts the amplified transmit audio signal to a digital representation thereof and passes the digital representation to the codec. A control processor controls operation of the interface and the audio codec.

Figure 2:
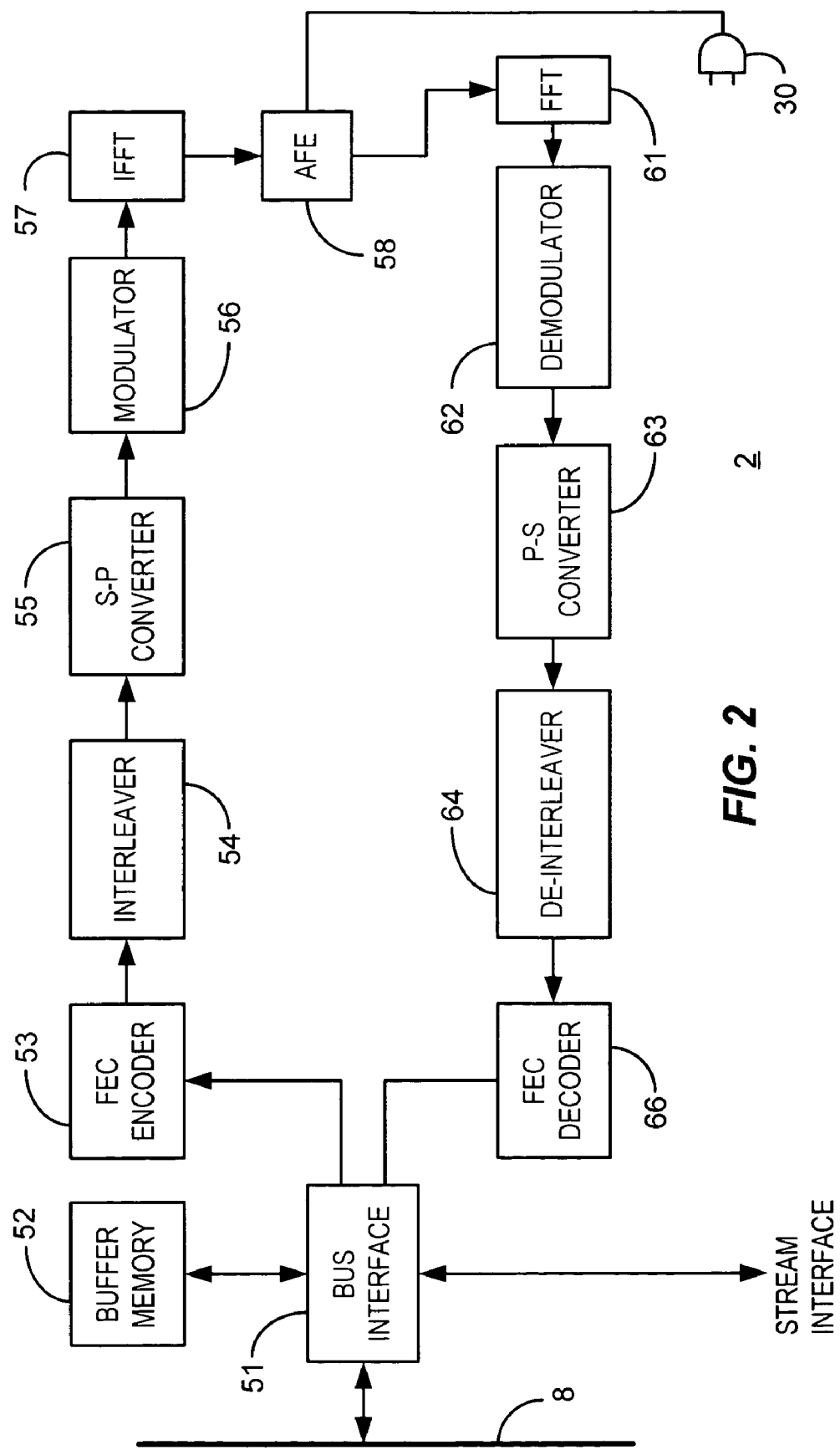
FIG. 2 is a block diagram of a power line communication (PLC) interface consistent with certain embodiments of the present invention.

FIG. 2 is a block diagram illustrating an exemplary PLC interface such as interface 2. The top signal path represents a data transmission path. Data to be transmitted over the power line 1 are received from internal bus 8 by Bus Interface 51 and temporarily stored in Buffer Memory 52. Error correction code can be added to the data read from Buffer Memory 52 in Forward Error Correction (FEC) Encoder 53. The output data are interleaved by Interleaver 54 and Serial-Parallel converted by S-P Converter 55. The parallel signals are modulated by Modulator 56 and sent to Inverse Fast Fourier Transform Block 57. In IFFT 57, the input signal is divided among available sub-carriers and inverse fast fourier transformed. The resulting signal is sent to Analog Front End (AFE) 58 and sent to the power line 1 through the power plug 30.

The lower half blocks of FIG. 2 are used for data reception. The input data are processed in a reversed manner as the processing used for transmission. AFE 58 receives a data stream from the client over the power line 1. The received data are fast-Fourier-transformed by FFT 61, demodulated by Demodulator 62 and parallel-serial converted by P-S converter 63. The result is de-interleaved by De-interleaver 64, error-corrected by FEC decoder 66 and sent to Bus Interface 51. The data are again temporarily stored in Buffer Memory 52 and then sent to the internal bus 8. The PLC Interface described simultaneously handles transmission and reception of data.

Thus, PLC interface consistent with certain embodiments has a transmit signal path having an error correction encoder receiving digital input and producing an output. A data interleaver receives the output of the error correction encoder to produce interleaved data. A serial to parallel converter converts the interleaved data to parallel data. A modulator modulates the parallel data using a selected modulation method. An inverse Fast Fourier Transformer transforms the modulated data. An interface couples the transformed data onto a power line. The power line interface further has a receive signal path having an interface for receiving data from a power line. A Fast Fourier Transformer Fast Fourier transforms data received over the power line. A parallel to serial converter converts the transformed data to serial format. A de-interleaver de-interleaves the serial format data. A forward error correction decoder error corrects the serial format data.

Embodiments consistent with this invention could also be used as a PLC based public address system in a school or small business. The system would allow a teacher in a classroom to reply to the school principal over the PA system.

Those skilled in the art will recognize that the certain embodiments have been described based upon use of a programmed processor. However, other embodiments could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments.

Those skilled in the art will appreciate that the program steps and associated data used to implement the embodiments described above can be implemented using disc storage as well as other forms of computer readable storage devices such as for example Read Only Memory (ROM) devices, Random Access Memory (RAM) devices; optical storage elements, magnetic storage elements, magneto-optical storage elements, flash memory, core memory and/or other equivalent storage technologies. Such alternative storage devices should be considered equivalents.

Certain embodiments described herein are implemented using a programmed processor executing programming instructions that can be stored on any suitable computer readable storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While specific embodiments have been described, it is evident that many alternatives, modifications, permutations and variations will become apparent to those skilled in the art in light of the foregoing description.

What is claimed is:

1. A digital intercom device, using power line communication (PLC), comprising:
    a power line interface for connection to a power line serving as a communication medium, wherein the interface communicates over the power line using Orthogonal Frequency Division Multiplexing (OFDM);
    an audio codec coupled to the power line interface for encoding and decoding digital data to and from data suitable for use by the power line interface;
    a digital to analog converter that receives digital decoded data from the codec and converts the digital coded data to a received analog signal;
    a receive audio amplifier that amplifies the received analog signal to a level adequate to drive a speaker;
    a transmit audio amplifier that amplifies a transmit audio signal and provides an amplified transmit audio signal as an output;
    an analog to digital converter that converts the amplified transmit audio signal to a digital representation thereof and passes the digital representation to the codec;
    a control processor that controls operation of the interface and the audio codec; and
    a switch interface receiving a signal from a push-to-talk switch, which causes the codec to encode the digital representation and the power line interface to place an OFDM modulated version of the digital representation onto the power line.

2. The apparatus of claim 1, wherein the PLC interface comprises a HomePlug® compliant PLC interface.

3. The apparatus of claim 1, further comprising a speaker that serves as a source of the transmit audio and further serves as the speaker.

4. The apparatus of claim 1, further comprising the speaker and a microphone, and wherein the microphone serves as a source for the transmit audio signal.

5. The apparatus of claim 1, further comprising means for receiving an analog audio source, and providing the analog audio source to the analog to digital converter.

6. The apparatus of claim 1, further comprising:
    an alarm switch coupled to the processor;
    a memory;
    a digital stream stored in the memory that corresponds to an alarm sound; and
    means for sending the digital stream to the audio codec when the alarm switch is actuated.

7. The apparatus of claim 6, wherein the alarm switch comprises at least one of a door switch, a window switch, a motion detection switch, a fire detection switch, a smoke detection switch and a carbon dioxide detection switch.

8. The apparatus of claim 1, wherein the push-to-talk switch is adapted to be set in an active position without holding the switch in place, in order to alter the operation of the intercom to function as a monitor device.

9. The apparatus of claim 1, wherein the switch interface is adapted to be set in an operational mode so that without holding a push-to-talk switch in place, the operation of the intercom is altered to function as a monitor device.

10. The apparatus of claim 1, wherein the codec operates as a full duplex codec.

11. The apparatus of claim 1, wherein the codec operates as a half duplex codec.

12. The apparatus of claim 1, wherein the power line interface has a transmit signal path comprising:
    an error correction encoder receiving digital input and producing an output;
    a data interleaver receiving the output of the error correction encoder to produce interleaved data;
    a serial to parallel converter that converts the interleaved data to parallel data;
    a modulator that modulates the parallel data using a selected modulation method;
    an inverse Fast Fourier Transformer that transforms the modulated data; and
    an interface for coupling the transformed data onto a power line.

13. The apparatus of claim 1, wherein the power line interface has a receive signal path, comprising:
    an interface for receiving data from a power line;
    a Fast Fourier Transformer for Fast Fourier transforming data received over the power line;
    a parallel to serial converter that converts the transformed data to serial format;
    a de-interleaver that de-interleaves the serial format data; and a forward error correction decoder that error corrects the serial format data.

14. A digital intercom device, using power line communication (PLC), comprising:
a HomePlug® compliant power line interface for connection to a power line serving as a communication medium, wherein the interface communicates over the power line using Orthogonal Frequency Division Multiplexing (OFDM);
an audio codec coupled to the power line interface for encoding and decoding digital data to and from data suitable for use by the power line interface;
a digital to analog converter that receives digital decoded data from the codec and converts the digital coded data to a received analog signal;
a speaker;
a receive audio amplifier that amplifies the received analog signal to a level adequate to drive the speaker;
a transmit audio amplifier that amplifies a transmit audio signal and provides an amplified transmit audio signal as an output;
an analog to digital converter that converts the amplified transmit audio signal to a digital representation thereof and passes the digital representation to the codec;
a control processor that controls operation of the interface and the audio codec;
a switch interface receiving a signal from a push-to-talk switch, which causes the codec to encode the digital representation and the power line interface to place an OFDM modulated version of the digital representation onto the power line;
means for receiving an analog audio source, and providing the analog audio source to the analog to digital converter;
an alarm switch coupled to the processor;
a memory;
a digital stream stored in the memory that corresponds to an alarm sound; and
means for sending the digital stream to the audio codec when the alarm switch is actuated.

15. The apparatus of claim 14, wherein the speaker also serves as a source of the transmit audio.

16. The apparatus of claim 14, further comprising a microphone, and wherein the microphone serves as a source for the transmit audio signal.

17. The apparatus of claim 14, wherein the alarm switch comprises at least one of a door switch, a window switch, a motion detection switch, a fire detection switch, a smoke detection switch and a carbon dioxide detection switch.

18. The apparatus of claim 14, wherein the push-to-talk switch is adapted to be set in an active position without holding the switch in place, in order to alter the operation of the intercom to function as a monitor device.

19. The apparatus of claim 14, wherein the switch interface is adapted to be set in an operational mode so that without holding a push-to-talk switch in place, the operation of the intercom is altered to function as a monitor device.

20. The apparatus of claim 14, wherein the codec operates as a full duplex codec.

21. The apparatus of claim 14, wherein the codec operates as a half duplex codec.

22. The apparatus of claim 14, wherein the power line interface has a transmit signal path comprising:
an error correction encoder receiving digital input and producing an output;
a data interleaver receiving the output of the error correction encoder to produce interleaved data;
a serial to parallel converter that converts the interleaved data to parallel data;
a modulator that modulates the parallel data using a selected modulation method;
an inverse Fast Fourier Transformer that transforms the modulated data; and
an interface for coupling the transformed data onto a power line; and wherein the power line interface further has a receive signal path comprising:
an interface for receiving data from a power line;
a Fast Fourier Transformer for Fast Fourier transforming data received over the power line;
a parallel to serial converter that converts the transformed data to serial format;
a de-interleaver that de-interleaves the serial format data; and
a forward error correction decoder that error corrects the serial format data.

23. A digital room monitor device using power line communication (PLC), comprising:
a power line interface for connection to a power line serving as a communication medium, wherein the interface communicates over the power line using Orthogonal Frequency Division Multiplexing (OFDM);
an audio codec coupled to the power line interface for encoding digital data to a format suitable for use by the power line interface;
a microphone device;
a transmit audio amplifier that amplifies a transmit audio signal and provides an amplified transmit audio signal as an output;
an analog to digital converter that converts the amplified transmit audio signal to a digital representation thereof and passes the digital representation to the codec; and
a control processor that controls operation of the interface and the audio codec.

24. The apparatus of claim 23, wherein the PLC interface comprises a HomePlug® compliant PLC interface.

25. The apparatus of claim 23, further comprising one of a speaker and a microphone that serves as the microphone device.

26. The apparatus of claim 23, further comprising:
an alarm switch coupled to the processor;
a memory;
a digital stream stored in the memory that corresponds to an alarm sound; and
means for sending the digital stream to the audio codec when the alarm switch is actuated.

27. The apparatus of claim 23, wherein the alarm switch comprises at least one of a door switch, a window switch, a motion detection switch, a fire detection switch, a smoke detection switch and a carbon dioxide detection switch.

28. The apparatus of claim 23, wherein the power line interface has a receive signal path, comprising:
an interface for receiving data from a power line;
a Fast Fourier Transformer for Fast Fourier transforming data received over the power line;
a parallel to serial converter that converts the transformed data to serial format;
a de-interleaver that de-interleaves the serial format data; and
a forward error correction decoder that error corrects the serial format data.

* * * * *